(12) United States Patent
Haerterich et al.

(10) Patent No.: US 11,366,982 B2
(45) Date of Patent: Jun. 21, 2022

(54) COMPUTER SYSTEMS FOR DETECTING TRAINING DATA USAGE IN GENERATIVE MODELS

(71) Applicant: SAP SE, Walldorf (DE)

(72) Inventors: Martin Haerterich, Wiesloch (DE); Benjamin Hilprecht, Mannheim (DE); Daniel Bernau, Karlsruhe (DE)

(73) Assignee: SAP SE, Walldorf (DE)

( * ) Notice: Subject to any disclaimer, the term of this patent is extended or adjusted under 35 U.S.C. 154(b) by 941 days.

(21) Appl. No.: 16/140,022

(22) Filed: Sep. 24, 2018

(65) Prior Publication Data
US 2020/0097763 A1 Mar. 26, 2020

(51) Int. Cl.
G06K 9/62 (2022.01)
G06V 10/50 (2022.01)
G06N 20/00 (2019.01)

(52) U.S. Cl.
CPC ......... *G06K 9/6248* (2013.01); *G06K 9/6256* (2013.01); *G06N 20/00* (2019.01); *G06V 10/507* (2022.01)

(58) Field of Classification Search
None
See application file for complete search history.

(56) References Cited

PUBLICATIONS

Xu W, Evans D, Qi Y. Feature squeezing: Detecting adversarial examples in deep neural networks. arXiv preprint arXiv:1704.01155. Apr. 4, 2017. (Year: 2017).*

Abadi, Martin, et al., "Tensorflow: a system for large-scale machine learning.", 12th UNSENIX Symposium on Operation Systems Design and Implementation., (2016), 265-283.
Ackley, David, et al., "A Learning Algorithm for Boltzmann Machines", Cognitive Science 9, (1985), 147-169.
Bowman, Samuel, et al., "Generating Sentences form a Continuous Space", arXiv:1511.06349, (2015), 13 pgs.
Dalai, N., et al., "Histograms of oriented gradients for human detection", IEEE Computer Society Conference on Computer Vision and Pattern Recognition, 2005. CVPR 2005. vol. 1, (2005), 886-893.
Donahue, Chris, "Synthesizing audio with generative adversarial networks", arXiv:1802.04208v1, (2018), 11 pgs.
(Continued)

*Primary Examiner* — Clifford Hilaire
(74) *Attorney, Agent, or Firm* — Schwegman Lundberg & Woessner, P.A.

(57) ABSTRACT

Various examples are directed to systems and methods for detecting training data for a generative model. A computer system may access generative model sample data and a first test sample. The computer system may determine whether a first generative model sample of the plurality of generative model samples is within a threshold distance of the first test sample and whether a second generative model sample of the plurality of generative model samples is within the threshold distance of the first test sample. The computer system may determine that a probability that the generative model was trained with the first test sample is greater than or equal to a threshold probability based at least in part on whether the first generative model sample is within the threshold distance of the first test sample, the determining also based at least in part on whether the second generative model sample is within the threshold distance of the first test sample.

20 Claims, 10 Drawing Sheets

(56) References Cited

PUBLICATIONS

Ebrahimzadeh, Reza, et al., "Efficient handwritten digit recognition based on histogram of oriented gradients and svm", International Journal of Computer Applications, vol. 104, No. 9, (2014), 5 pgs.
Fredrikson, Matt, et al., "Model inversion Attacks that Exploit Confidence Information and Basic Countermeasures", IGSAC Conference on Computer and Communications Security, (2015), 1322-1333.
Goodfellow, Ian, et al., "Generative Adversarial Nets", Advances in Neural Information Processing Systems 27, Curran Associates, Inc., (Jun. 10, 2014), 9 pgs.
Goodfellow, Ian, "NIPS 2016 tutorial: Generative adversarial networks", arXiv preprint arXiv:1701.00160, (2016), 57 pgs.
Hayes, Jamie, et al., "LOGAN: Evaluating Information Leakage of Generative Models Using Generative Adversarial Networks", arXiv preprint arXiv:1705.07663, (2017), 18 pgs.
Kingma, Diederik P, et al., "Auto-Encoding Variational Bayes", arXiv:1312.6114v10, (2014), 14 pgs.
Krizhevsky, Alex, "Learning Multiple Layers of Features from Tiny Images", In Technical Report of University of Toronto, (Apr. 8, 2009), 1-60.
Lucic, M., et al., "Are Gans Created Equal? A Large-Scale Study", arXiv:1711.10337, 2017, (2017), 19 pgs.
Neal, Radford, "Annealed Importance Sampling", Technical Report No. 9805, Department of Statistics, University of Toronto. arXiv:physics/9803008v2, (1998), 25 pgs.
Neal, Radford, "Annealed Importance Sampling", Statistics and Computing, 11, (2001), 125-139.
Parzen, Emanuel, "On estimation of a probability density function and mode", The annals of mathematical statistics, vol. 33, No. 3, (1962), 1065-1076.
Pedregosa, F, et al., "Scikit-learn: Machine Learning in Python", J Mach Learn Res, vol. 12, (Nov. 2011), 2825-2830.
Radford, Alec, et al., "Unsupervised representation learning with deep convolutional generative adversarial networks", arXiv:1511.06434v1, (2015), 15 pgs.
Shokri, Reza, et al., "Membership Inference Attacks Against Machine Learning Models", arXiv:1610.05820v2, (2017), 16 pgs.
Srivastava, N, et al., "Dropout: A simple way to prevent neural networks from overtting", The Journal of Machine Learning Research, vol. 15, No. 1, (2014), 1929-1958.
Theis, L, "A note on the evaluation of generative models", rxiv.org/abs/1511.01844. International Conference on Learning Representations., (2016), 10 pgs.
Tramer, F, et al., "Stealing Machine Learning Models via Prediction APIs", USENIX Security Symposium, pages, (2016), 601-618.
Wu, Yuhuai, et al., "On the Quantitative Analysis of Decoder-Based Generative Models", arXiv:1611.04273v1, (2016), 16 pgs.
Xiao, H, et al., "Fashion-mnist: a novel image dataset for benchmarking machine learning algorithms", arXiv:1708.07747v1, (2017), 6 pgs.
Yeh, Raymond, et al., "Semantic image inpainting with deep generative models", IEEE Conference on Computer Vision and Pattern Recognition, (2017), 6882-6890.
Yeom, Samuel, et al., "The Unintended Consequences of Over?tting: Training Data Inference Attacks", rXiv:1709.01604, (2017), 31 pgs.

\* cited by examiner

COMPUTER SYSTEMS FOR DETECTING TRAINING DATA USAGE IN GENERATIVE MODELS

TECHNICAL FIELD

This document generally relates to methods and systems for use with computer devices, including networked computing devices. More particularly, this document relates to systems and methods for detecting the use of particular training data in a generative model.

BACKGROUND

Machine learning is used in various contexts to improve the performance of computer systems and to expand the types of tasks that computer systems can perform. A computer system is used to train a machine learning model to perform a particular task, such as selecting advertisements to show to users, translating text, etc. The computer system receives training data indicating a desired outcome for the task. The computer system uses the training data to train the machine learning model to provide a desired outcome from available inputs.

A generative model is a type of machine learning model that is used to generate data that is consistent with training data. For example, a generative model is trained to determine the probability distribution p(X, Y) of features X and labels Y of a data set. A computer system programmed to execute a generative model is provided with a label Y and in response generates a feature or set of features X that are consistent with the label Y. For example, a generative model can be used to generate images, prices for stocks, etc.

BRIEF DESCRIPTION OF DRAWINGS

The present disclosure is illustrated by way of example, and not limitation, in the following figures.

DETAILED DESCRIPTION

Figure 1:
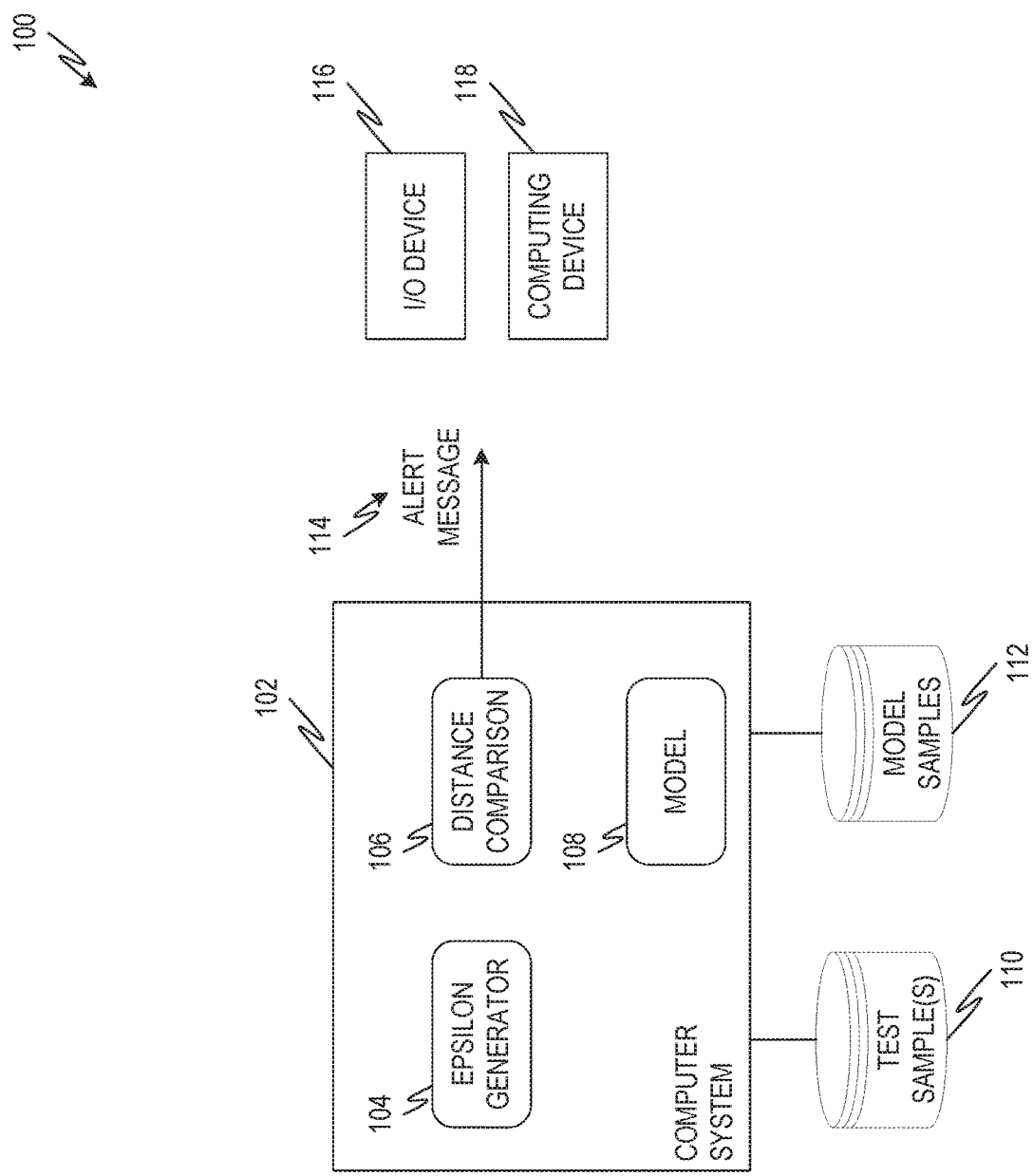
FIG. 1 is a diagram showing one example of an environment including a computer system programmed to detect training data usage in generative models.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

The success of a machine learning model implemented by a computer system is related to the quality and quantity of the training data used. This presents several challenges to implementing a suitable machine learning model with a computer system. For example, training data often includes sensitive information, such as health records, personal information, etc. The sensitive nature of training data can come from the data itself and, sometimes, just from the fact that data about an individual or organization belongs to a certain data set. For example, a training data set could describe cancer patients. The fact that a particular patient is part of that training data set may itself be sensitive.

Accordingly, it is desirable to generate machine learning models that do not leak training data. A machine learning model that leaks training data may allow some or all of the information included in the training data to be reconstructed from the output of the model. Also, the potentially sensitive nature of training data has prompted many jurisdictions to place limits on what data can be used to train a machine learning model. For example, in some jurisdictions, data collected for one purpose (e.g., for providing healthcare to individuals) cannot be used to train a machine learning model.

For these and other reasons, it is desirable to accurately detect training data usage for machine learning models, such as generative models. Techniques for detecting training data usage at a machine learning model are sometimes referred to as membership inference techniques. Membership inference techniques can be used to analyze a machine learning model to determine if it leaks training data. This improves the operation of the underlying computer system, at least by allowing the computer system to detect less desirable models (e.g., machine learning models that leak training data). Membership inference techniques can also be used by regulatory bodies or other interested parties to detect whether a particular test sample or set of test samples were part of the training data for a given machine learning model.

For these and other reasons, it is desirable to accurately determine whether a test sample or set of test samples were used to train a particular machine learning model. Techniques for determining whether a test sample or set of test samples were used to train a machine learning model can be referred to as membership inference techniques or membership inference attacks. A membership inference attack can be used, for example, by a regulatory body to determine whether particular data was used improperly to train a machine learning model. Membership inference attacks can also be used, for example, by a regulatory body or even the party implementing a machine learning model on a to determine whether the machine learning model leaks sensitive data.

Existing membership inference techniques for generative machine learning models ("generative models") have disadvantages. For example, some existing techniques, such as white box techniques, require knowledge of the internal components of the generative model. Also, many existing techniques have relatively low average accuracies, sometimes at or about 50%.

These and other challenges are addressed by the systems and methods described herein for detecting training data usage in generative models. Various examples are directed to determining whether a set of generative model samples are in an epsilon environment with a test sample. A generative model sample is in an epsilon environment with a test sample if the generative model sample is separated from the test sample by less than a threshold distance, which can be referred to as an epsilon threshold distance. A computer system compares at least one test sample to a plurality of model samples to determine whether the generative model samples are within an epsilon environment of the model samples. Based on the comparison, the computer system determines a probability that the generative model was trained with the test sample. In some examples, the computer system determines the probability by generated a Monte Carlo integration, as described herein.

If the probability is above a threshold, the computer system can send an alert message indicating that the generative model was trained with the test sample. The alert message can take various forms. In some examples, the alert message is an output displayed an input/output device of the computer system. In some examples, the alert message is a message sent to another computing device, such as a Short Message Service (SMS) message, an e-mail message, etc. In some examples, the alert message is a record written to a database or other suitable data structure.

The comparisons between test samples and generative model samples described herein and the resulting probability that a test sample was used to train the generative model. This can be used to improve the operation of the computer system in various different ways. In some examples, it is not initially known whether a test sample was part of the training data for the generative models. In these examples, the systems and methods described herein improve the ability of the computer system to determine whether the test sample was in fact used to train the generative model. For example, the test sample can include data that is not permitted to be used as training data. The computer system can determine whether the test sample was improperly used for to train the generative model. In other examples, it is known that the test sample was used to train the generative model. In these examples, the systems and methods described herein improve the ability of the computing device to detect whether the generative model leaks training data.

FIG. 1 is a diagram showing one example of an environment 100 including a computer system 102 programmed to detect training data in generative models. The computer system 102 can include any suitable computing device or combination of networked computing devices. For example, the computer system 102 can include one or more servers, one or more desktop computers, one or more tablet computers, etc. In some examples, one or more of the computing device or devices making up the computer system 102 includes one or more hardware components optimized for machine learning such as, for example, one or more graphics processing units (CPUs), one or more field programmable gate arrays (FPGAs), etc.

The computer system 102 comprises various subsystems an epsilon generator subsystem 104, a distance comparison subsystem 106, and an optional mode subsystem 108. The computer system 102 receives data from one or more data sources. For example, test sample data can be received from a test sample storage module 110. Model sample data can be received from a model sample storage module 112. Test sample data includes one or more test samples. Test samples are compared to a generative model to determine a probability that the test samples were used to train the generative model. Model samples are outputs of the generative model. Although FIG. 1 shows receiving test samples and model samples from separate storage modules 110, 112, test samples and model samples can be received from any suitable device and/or stored in any suitable manner. In some examples, model samples are generated by the model subsystem 112 as described herein.

The epsilon generator subsystem 104 is configured determine an epsilon threshold for use in detecting training data usage as described herein. Example techniques for generating the epsilon threshold are described herein with respect to FIG. 6. The distance comparison subsystem 106 is configured to apply the epsilon threshold, as described herein, to determine if generative model samples created by the generative model are in an epsilon environment relative to at least one test sample. The optional model subsystem 108 applies a generative model to generate the model samples. In some examples, the model subsystem 108 is omitted and the model samples are received from an external computer system.

As described herein, the distance comparison subsystem 106 determines a probability that a given test sample or set of test samples were used to train the generative model. If the probability is greater than or equal to a threshold, the distance comparison subsystem 106 generates the alert message 114 indicating that the considered test sample or set of test samples is likely to have been used to train the generative model. The alert message can be sent to an Input/Output device 116 associated with the computer system 102, such as a display screen, a speaker, etc. In some examples, the alert message 114 is provided to another computing device 118. The computing device 118 can be in communication with the computer system 102, for example, via a communication network, as described herein.

Figure 2:
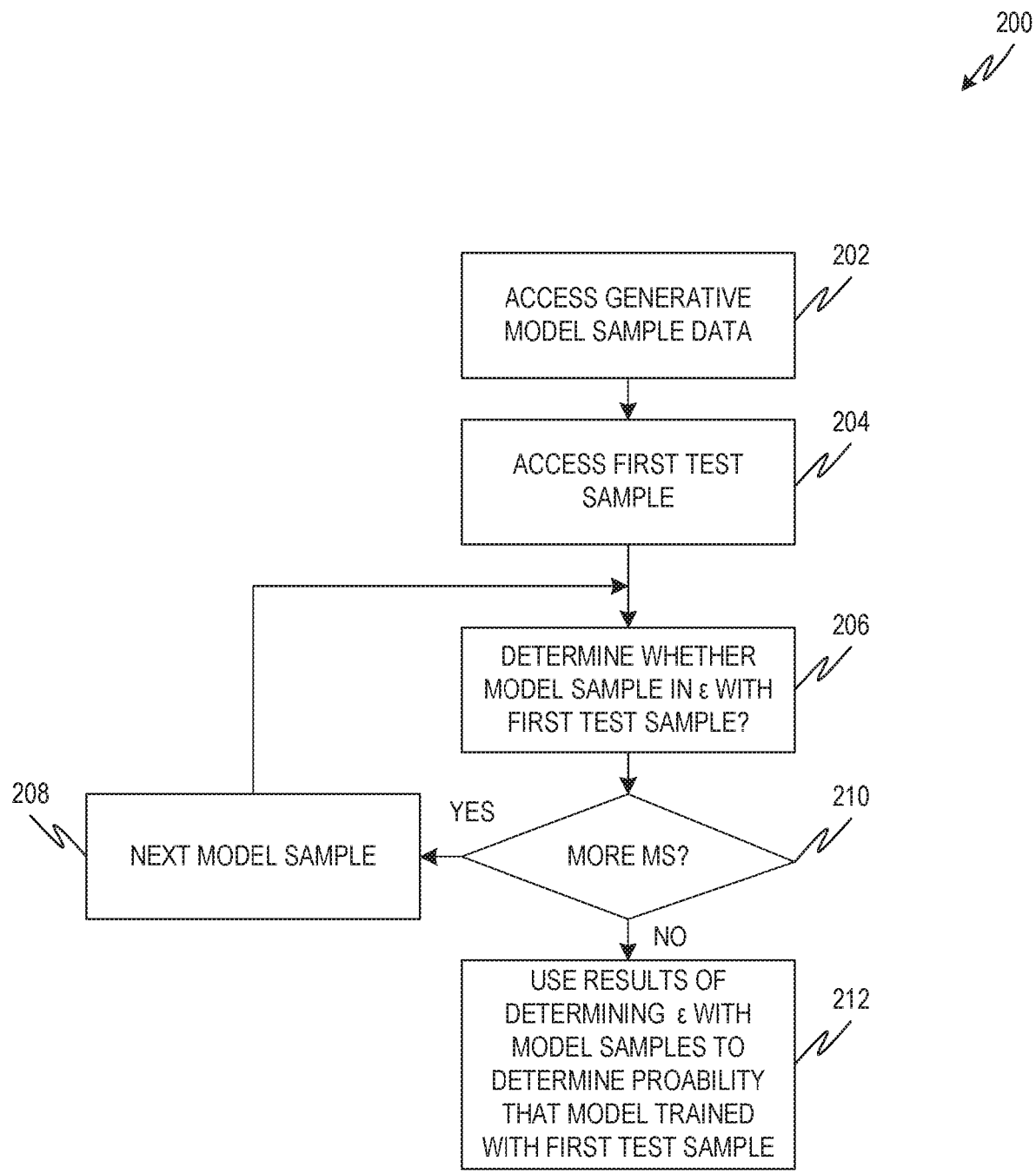
FIG. 2 is a flowchart showing one example of a process flow that can be executed by a computer system to detect training data usage in a generative model.

FIG. 2 is a flowchart showing one example of a process flow 200 that can be executed by a computer system, such as the computer system 102 of FIG. 1, to detect training data usage in a generative model. At operation 202, the computer system accesses generative model sample data. The generative model sample data includes generative model samples that are outputs of the generative model. For example, when the generative model is configured to create images matching a set of one or more labels, the generative model samples can include sets of images created by the generative model. In another example where the generative model creates stock or index quotes, each generative model sample can include a stock or index quote created by the generative model. The computer system can access the generative model sample data from a storage module of the computer system, such as the storage module 112 described herein. The generative model samples can be generated by the computer system and/or received from another computer system.

At operation 204, the computer system accesses a test sample. The test sample is an example of the type of sample created by the generative model that may have been used as training data to train the generative model. The test sample can be accessed from a storage module, such as the storage module 110, or from any other suitable location.

At operation 206, the computer system determines whether the generative model sample is in an epsilon environment with a generative model sample of the generative model sample data. This can include, for example, determining whether a distance between the test sample and the generative model sample is less than an epsilon threshold. The distance between the test sample and the generative model sample can be determined in any suitable manner, for example, as described herein. The epsilon threshold can also be determined in various different ways, for example, as described herein with respect to FIG. 6.

At operation 210, the computer system determines whether there are additional generative model samples. If yes, the computer system moves to the next generative model sample at operation 208 and then returns to operation 206. If all generative model samples have been considered, the computer system executes operation 212. At operation 212, the computer system uses the results of determining whether the test sample is in an epsilon environment with the various generative model samples at operation 206 to determine a probability that the test sample is part of the training data for the generative model.

In some examples, the probability that the test sample is part of the training data for the generative model is given by the probability that the generative model samples of the model sample data are in the epsilon environment of the test sample, as set forth by Equation [1] below:

$$P(G \in U_\epsilon(x)) = \mathbb{E}_{G - pgenerator}(1_{G \in U_\epsilon(x)}) \qquad [1]$$

Figure 3:
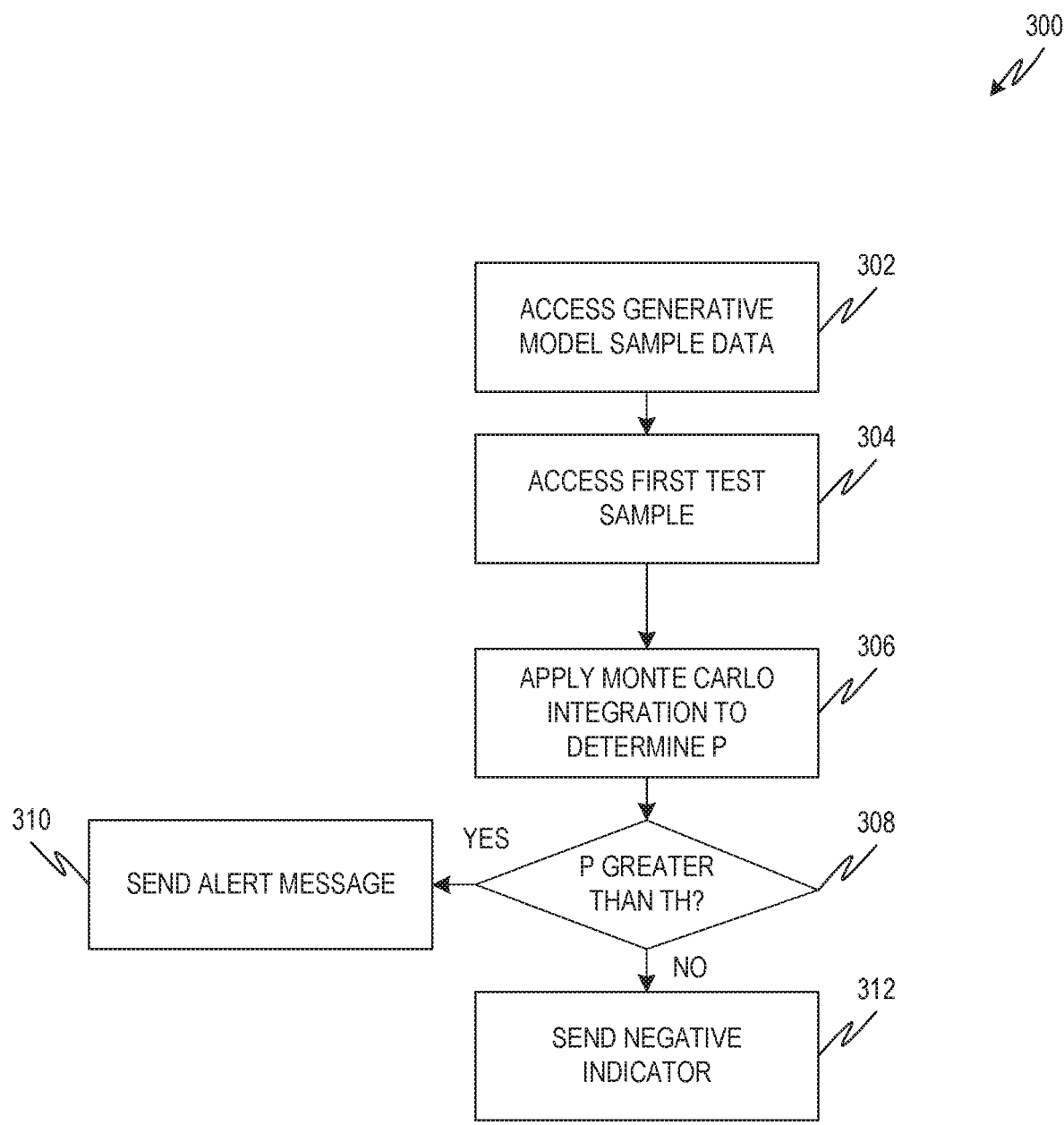
FIG. 3 is a flowchart showing one example of a process flow that can be executed by a computer system to detect training data usage in a generative model utilizing Monte Carlo integration.
Figure 4:
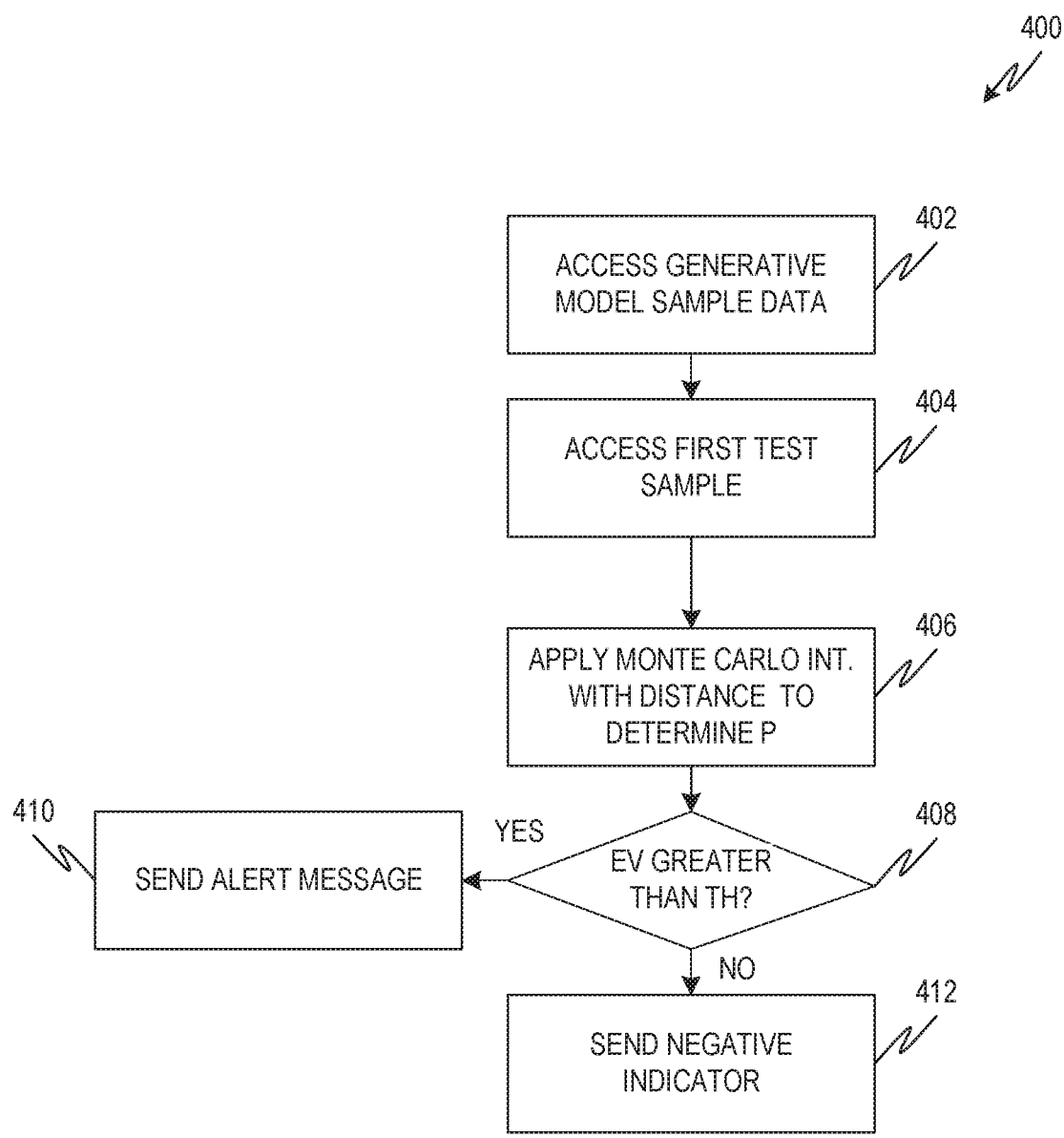
FIG. 4 is a flowchart showing one example of a process flow that can be executed by a computer system to detect training data usage in a generative model utilizing Monte Carlo integration incorporating a distance measurement.
Figure 5:
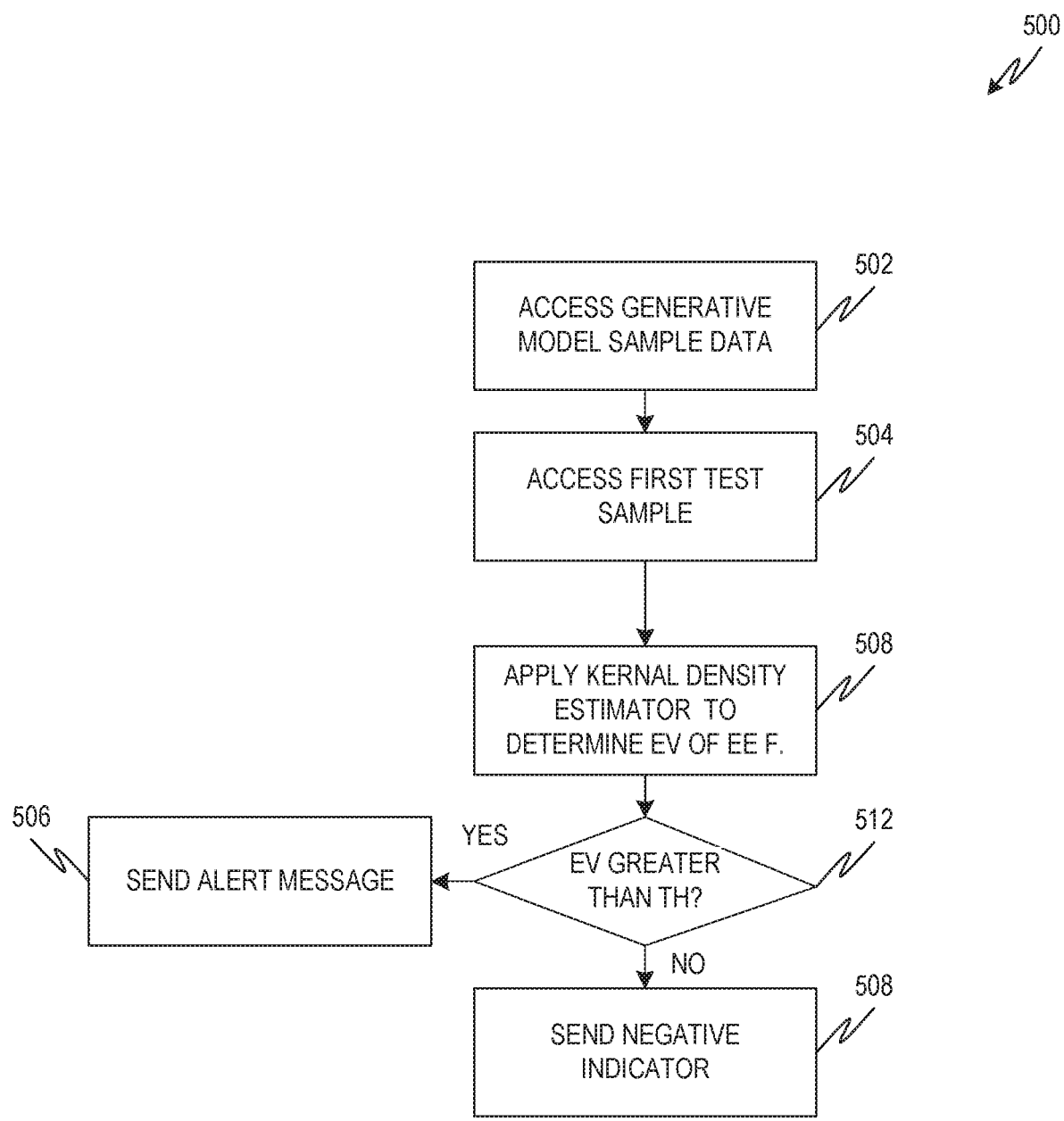
FIG. 5 is a flowchart showing one example of a process flow that can be executed by a computer system to detect training data usage in a generative model utilizing a Kernel Density Estimator (KDE).

In Equation [1], the probability that the generative model samples of the model sample data are in the epsilon environment of the test sample is given on the left side of the equation by $P(G \in U_\epsilon(x))$. The right side of Equation [1] indicates an expected value of a random variable. $1_{G \in U_\epsilon(x)}$, that is equal to one if the set of generative model samples are in the epsilon environment of the test sample and zero otherwise. Various methods can be used by the computer system to estimate the probability given by Equation [1]. For example, FIGS. 3 and 4 show examples that estimate Equation [1] utilizing Monte Carlo integration. FIG. 5 shows an example that estimates Equation [1] utilizing a Kernel Density Estimator (KDE).

FIG. 3 is a flowchart showing one example of a process flow 300 that can be executed by a computer system (e.g., the distance comparison subsystem 106 of the computer system 102) to detect training data usage in a generative model utilizing Monte Carlo integration. At operation 302, the computer system accesses generative model sample data. The generative model sample data includes generative model samples that are outputs of the generative model. At operation 304, the computer system accesses a test sample. The test sample is an example of the type of sample created by the generative model that may have been used as training data to train the generative model. The test sample can be accessed from a storage module, such as the storage module 110, or from any other suitable location.

At operation 306, the computer system applies Monte Carlo integration to determine the probability that the test sample was used to train the generative model. As described by Equation [1] above, the probability that the test sample was used to train the generative model is given by the expected value of the random variable $1_{G \in U_\epsilon(x)}$. An example illustrating how the computer system can find the expected value of the random variable $1_{G \in U_\epsilon(x)}$ is provided by Equation [2] below:

$$\hat{f}_{MC-\epsilon}(x) = \frac{1}{n}\sum_{i=1}^{n} 1_{g_i \in U_\epsilon(x)} \qquad [2]$$

According to Equation [2], the computer system considers the test sample x and a set of n generative model samples $g_i$. For each combination of the test sample x and one of the generative model samples $g_i$, the computer system determines whether the generative model sample $g_i$ is in the epsilon environment of the test sample x. For example, the computer system can determine whether the respective generative model samples $g_i$ are in the epsilon environment with the test sample x with successive determinations similar to those described with respect to FIG. 2. This gives a value of the random variable $1_{g_i \in U\epsilon(x)}$. Averaging the random variable $1_{g_i \in U\epsilon(x)}$ over all i gives the expected value of the random variable $1_{G \in U_\epsilon(x)}$, which, as set forth above, is an approximation of the probability that the test sample was used to train the generative model.

At operation 308, the computer system determines if the probability determined at operation 306 is greater than or equal to a threshold probability. The threshold probability can be determined in any suitable manner. For example, the threshold probability can be 50%. In some examples, the threshold is determined by comparison to the probability returned for samples from a comparison set. The comparison set can include samples that are known or believed not to have been used to train the generative model.

If the probability is greater than or equal to the threshold probability, then the computer system sends an alert message at operation 310. The alert message indicates that the test sample is likely part of the training data for the generative model. If the probability is not greater than or equal to the threshold probability, then the computer system, optionally, sends a negative indicator at operation 312. The negative indicator indicates that the test sample is likely not part of the training data for the generative model.

In some examples, the computer system can utilize a Monte Carlo integration method similar to that of FIG. 3, albeit while incorporating a distance measurement into the Monte Carlo integration. For example, the probability that the generative model samples of the model sample data are in the epsilon environment of the test sample can be expressed as given by Equation [3] below:

$$P(G \in U_\epsilon(x)) = \mathbb{E}_{G - pgenerator}(1_{G \in U_\epsilon(x)} \log(d(G,x) + \delta)) \qquad [3]$$

In Equation [3], d(G,x) is the distance between the set of generative model samples G and the test sample x. The logarithm is included to reduce the affect that outlier distances have on the overall result. The factor $\delta > 0$ may be selected to avoid the case log(0) if the distance is zero.

FIG. 4 is a flowchart showing one example of a process flow 400 that can be executed by a computer system (e.g., the distance comparison subsystem 106 of the computer system 102) to detect training data usage in a generative model utilizing Monte Carlo integration incorporating a distance measurement. At operation 402, the computer system accesses generative model sample data. The generative model sample data includes generative model samples that are outputs of the generative model. At operation 404, the computer system accesses a test sample.

At operation 406, the computer system applies Monte Carlo integration incorporating a distance measurement to determine the probability that the test sample was used to train the generative model. As described by Equation [1] above, the probability that the test sample was used to train the generative model is given by the expected value of the random variable $1_{G \in U_\epsilon(x)}$. An example Monte Carlo integration that finds the expected value of the random variable $1_{G \in U_\epsilon(x)}$ using a distance measurement is provided by Equation [4] below:

$$\hat{f}_{MC-d}(x) = \frac{1}{n} \sum_{i=1}^{n} 1_{g_i \in U_\epsilon(x)} \log d(g_i, x) \quad [4]$$

For example, Equation [4] is a Monte Carlo integration approximation of Equation [3] above. According to Equation [4], the computer system considers the test sample x and a set of n generative model samples $g_i$. For each combination of the test sample x and one of the generative model samples $g_i$, the computer system determines whether the generative model sample $g_i$ is in the epsilon environment of the test sample x and multiples the result (e.g., 1 or 0) by the log of the distance as shown. The result is the probability that the test sample is part of the training data for the generative model.

At operation 408, the computer system determines if the probability determined at operation 406 is greater than or equal to a threshold probability. If the probability is greater than or equal to the threshold probability, then the computer system sends an alert message at operation 410. The alert message indicates that the test sample is likely part of the training data for the generative model. If the probability is not greater than or equal to the threshold probability, then the computer system, optionally, sends a negative indicator at operation 412. The negative indicator indicates that the test sample is likely not part of the training data for the generative model.

FIG. 5 is a flowchart showing one example of a process flow 500 that can be executed by a computer system (e.g., the distance comparison subsystem 106 of the computer system 102) to detect training data usage in a generative model utilizing a Kernel Density Estimator (KDE). At operation 502, the computer system accesses generative model sample data. The generative model sample data includes generative model samples that are outputs of the generative model. At operation 504, the computer system accesses a test sample.

At operation 506, the computer system applies a KDE to determine a probability that the test sample is part of the training data for the generative model. An example KDE that can be applied to find the probability that the test sample is part of the training data for the generative model is given by Equation [5] below:

$$\hat{f}_{KDE}(x) = \frac{1}{nh^d} \sum_{i=1}^{n} K\left(\frac{x - g_i}{h^d}\right) \quad [5]$$

In Equation [5], K is a kernel, which may be the Gaussian kernel. $h^d$ is a bandwidth. According to Equation [5], the computer system considers the test sample x and a set of n generative model samples $g_i$. The computer system applies the kernel K to each combination of the test sample x and one of the generative model samples $g_i$, over the bandwidth, as shown. The results are averaged and divided by the bandwidth. The result is the probability that the test sample is part of the training data for the generative model.

At operation 508, the computer system determines if the probability determined at operation 506 is greater than or equal to a threshold probability. If the probability is greater than or equal to the threshold probability, then the computer system sends an alert message at operation 510. The alert message indicates that the test sample is likely part of the training data for the generative model. If the probability is not greater than or equal to the threshold probability, then the computer system, optionally, sends a negative indicator at operation 512. The negative indicator indicates that the test sample is likely not part of the training data for the generative model.

Various examples described herein determine a distance between samples (e.g., between the test sample and a generative model sample). For example, various different methods and systems described herein determine whether a generative model sample is within an epsilon environment of a test sample by determining whether a distance between the generative model and the test sample is less than an epsilon threshold.

There are various different ways that the distance between two samples can be determined. In some examples in which the respective samples are or include images, the distance between samples can be determined utilizing principal component analysis (PCA). A PCA distance method can be used for samples (e.g., test samples and/or generative model samples) that are images. According to PCA, an image sample is represented as a vector where values of the vector correspond to the pixel intensities of the image. A PCA is applied to a set of test sample vectors. The set of test sample vectors are derived from a set of test samples. The top vector components, as indicated by the PCA, are determined (e.g., the top forty components). To compute the distance between two new image samples, e.g., a test sample and a generative model sample, the PCA transformation is applied to the vectors of the two samples to generate a PCA vector of the test sample and a PCA vector of the generative model sample. A resulting distance is a Euclidian distance between the top vector components of the PCA vector of the generative model sample vector and the PCA vector of the test sample.

In another example, a Histogram of Oriented Gradients (HOG) method is used. HOG is a computer vision algorithm that can be applied to an image to generate feature vectors for the image. A HOG distance method can be used for samples that are images. According to a HOG distance method, an image sample is separated into cells. Inside the cells, occurrences of gradient orientations between pixels are counted. A histogram of the oriented gradients (HOG) over the cells is computed. The histogram is normalized block-wise and may be concatenated to obtain a feature vector. The Euclidian distance between feature vectors associated with two samples indicates the distance between the two samples.

In yet another example, a color histogram (CHIST) method is used. A CHIST method can be used for samples that are color images. According to a CHIST method, pixels in an image sample are sorted into bins based on the intensities of the color channels for the pixels. For example, pixels may have a red (R), green (G), and blue (B) intensity. Binning the pixels in this way results in a histogram of the distribution of colors in the sample. The histogram can be represented as a feature vector. The Euclidian distance between the feature vectors associated with two samples indicates the distance between the two samples.

Figure 6:
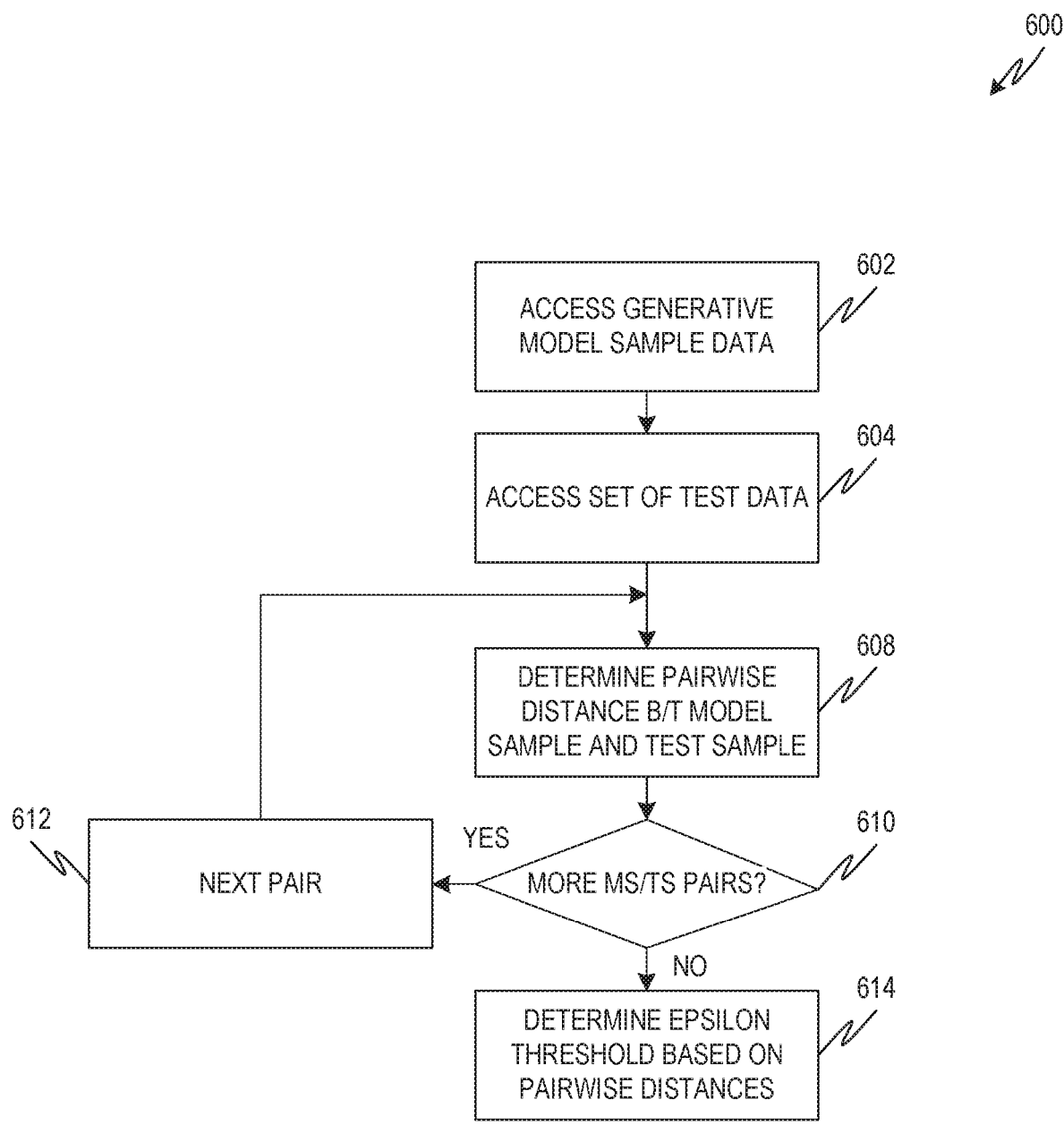
FIG. 6 is flowchart showing one example of a process flow that can be executed by a computer system to generate an epsilon threshold for detecting training data usage in generative models.

FIG. 6 is flowchart showing one example of a process flow 600 that can be executed by a computer system (e.g., the Epsilon generator 104 of the computer system 102) to generate an epsilon threshold for detecting training data usage in generative models. At operation 602, the computer system accesses generative model sample data including a plurality of generative model samples generated by a generative model. At operation 604, the computer system accesses a set of test data. The set of test data can include test samples. The test samples can include, for example, test samples known to be part of the training data for the generative mode and/or test samples that are to be tested to determine if the test samples were part of the training data for the generative model.

At operation 608, the computer system determines the pairwise distance between a first generative model sample and a test sample. This continues until distances have been found for each permutation of a generative model sample from the generative model sample data and a test sample from the test data. For example, if, at operation 610 there are additional pairs of generative model samples from the generative model sample data and test samples have not yet been considered, the computer system selects a next pair at operation 612 and determines the distance between that pair at operation 608.

When all pairs are consider, the result is a set of pairwise distances $d(x_i, g_i)$. The computer system determines the epsilon threshold based on the pairwise distances at operation 614. In some examples, this includes choosing as the epsilon threshold a distance that is a certain percentile of the pairwise distances. For example, the computer system may select as the epsilon threshold a distance that is the 0.1 percentile of the distances. (E.g., the distance that 0.1% of the determined distances are less than or equal to). In another example, the epsilon threshold is selected as the median of the minimum distance to each test sample over all generative model samples, for example, as given by Equation [6] below:

$$\varepsilon = \underset{1 \leq i \leq 2M}{\text{median}}\left(\underset{j \leq n}{\min}(x_i, g_j)\right) \quad [6]$$

The systems and methods described herein improve the performance of the computer system for detecting training data usage in generative models. To demonstrate this several tests were performed using two generative models. A first generative model was a deep convolutional generative adversarial network (DCGAN). A second generative model was a variational autoencoder (VAE) model. The generative models were trained and tested using the Modified National Institute of Standards and Technology (MNIST) dataset. The MNIST dataset is a standard dataset in machine learning and computer vision that includes 70,000 labeled, handwritten digits which are separated into 60,000 training samples and 10,000 other test samples. Each sample includes one digit and is a 28×28 gray scale image. In the demonstrations described herein, a 10% subset of the training images were uses so as to provoke overfitting to the training data.

The DCGAN was trained for 500 epochs with a mini batch size of 128. For the VAE had a standard architecture with 90% Dropout. The VAE was trained for 300 epochs, also with a mini batch size of 128. Ten (10) different 10% subsets of the training images from the MINST data were selected as the training data from the DCGAN and VAE models. For every subset, 10 single and set membership inference experiments were conducted, with M=100.

In the single membership inference experiments, M samples were selected from a set of training data used to train a generative model along with M samples that were not used to generate the model to generate a test dataset $\{x_i, \ldots, x_{2M}\}$. For every test sample $x_i$, systems and methods described herein were used to determine whether the test sample was part of the training data for the generative model. For example, the probability that each of the test samples $x_i$ were part of the training data for the generative model was determined using the systems and methods described herein. The threshold probability for determining that a particular test sample is part of the training data for the generative model was selected as the median probability of the set (e.g., the probability greater than or equal to or equal to the probabilities of the top M test samples).

In the set membership inference experiments, M samples from the training data $\{x_1, \ldots, x_M\}$ and M records from the remainder of the dataset $\{x'_1, \ldots, x'_M\}$ were used. In the experiment, the systems and methods described herein were used to determine which of the provided sets $\{x_1, \ldots, x_M\}$, $\{x'_1, \ldots, x'_M\}$ was a subset of the training data. Test samples from the two sets were evaluated. The M samples with the highest probability of being training data are determined. The set with the most samples among the M samples with the highest probability of being training data is determined to be a subset of the training data. If both sets have the same number of samples in the top M, then one of the sets was selected with a probability of 50%.

Figure 7:
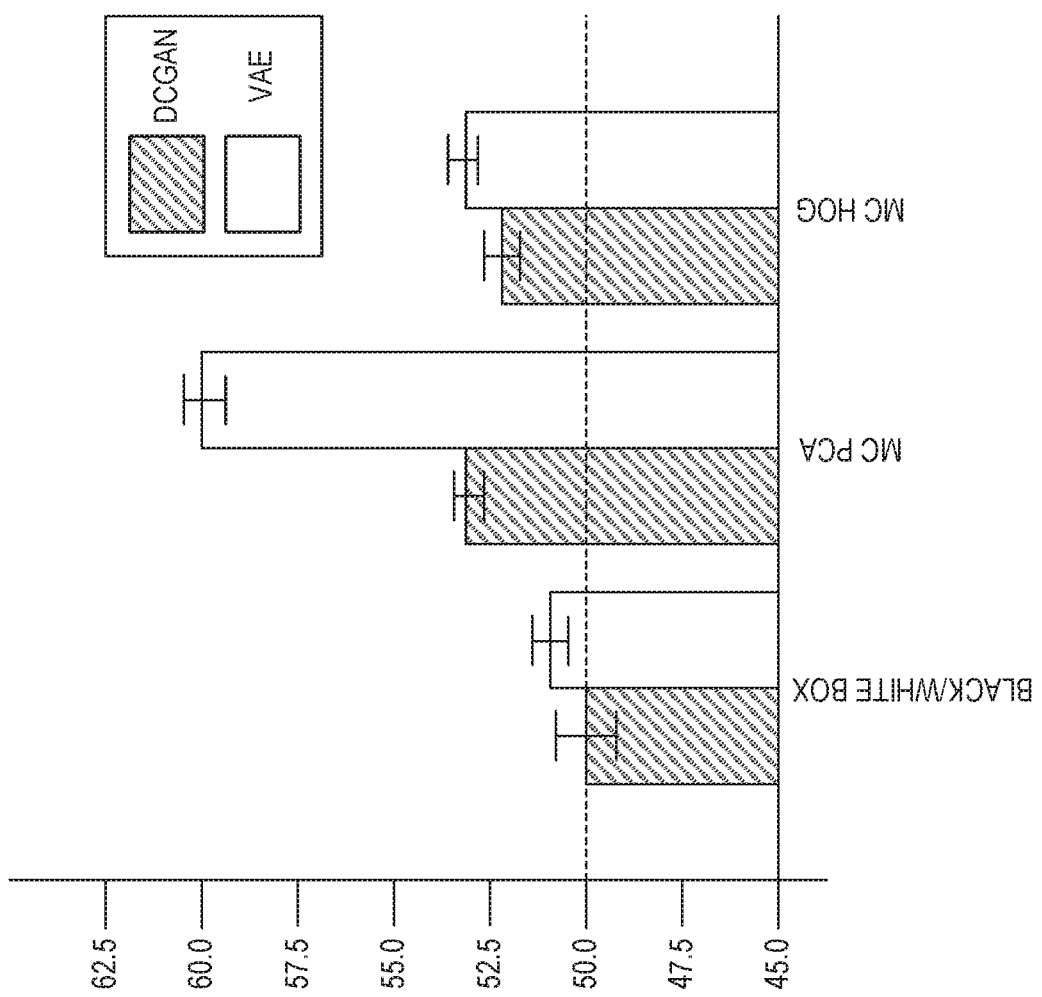
FIG. 7 is a diagram showing one example of results for detecting training data usage in generative models as described herein using a single membership inference test.

FIG. 7 is a diagram showing one example of results for detecting training data usage in generative models as described herein using a single membership inference test. In the example of FIG. 7, three different techniques were used to detect training data, a black box/white box technique, a Monte Carlo integration technique as described above with respect to FIG. 3 using a PCA distance measurement (MC PCA), and a Monte Carlo integration technique as described above with respect to FIG. 3 using an HOG distance measurement. Regarding the black box/white box technique, a white box technique was used for the DCGAN and a black box technique was used for the VAE. The value for the epsilon threshold was a median of the minimum distance to each test sample over all generative model samples. As shown, Monte Carlo integration technique provided improved accuracy over the black box/white box techniques using both PCA and HOG distance measurements.

Figure 8:
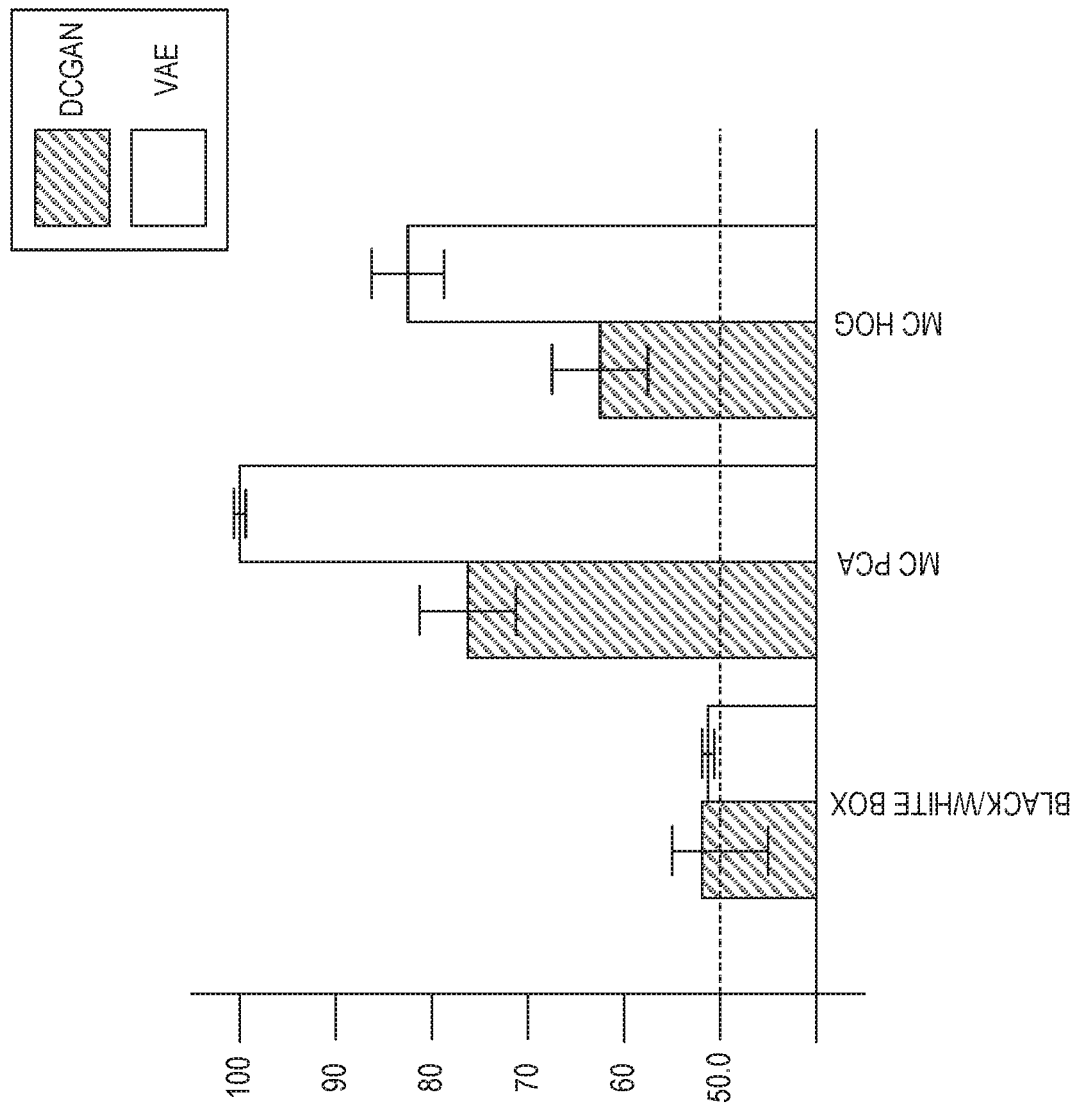
FIG. 8 is a diagram showing one example of results for detecting training data usage in generative models as described herein using a set membership inference test.

FIG. 8 is a diagram showing one example of results for detecting training data usage in generative models as described herein using a set membership inference test. In the example of FIG. 8, a black box/white box technique, a Monte Carlo integration technique as described above with respect to FIG. 3 using a PCA distance measurement (MC PCA), and a Monte Carlo integration technique as described above with respect to FIG. 3 using an HOG distance measurement were used, similar to FIG. 7. Regarding the black box/white box technique, a white box technique was used for the DCGAN and a black box technique was used for the VAE. The value for the epsilon threshold was a median of the minimum distance to each test sample over all generative model samples. As shown, Monte Carlo integration technique provided improved accuracy over the black box/white box techniques using both PCA and HOG distance measurements.

TABLE 1 below shows results of trials performed according to the methods described with respect to FIGS. 7 and 8 applying the techniques of FIGS. 3 and 4.

TABLE 1

| Heuristic/Percentile | GAN MC-d | GAN MC-ε | VAE MC-d | VAE MC-ε |
|---|---|---|---|---|
| HOG-based Distance | | | | |
| Median | 63.76 ± 3.83 | 63.76 ± 3.83 | 83.50 ± 2.43 | 83.50 ± 2.43 |
| 0.01 | 63.76 ± 3.68 | 66.11 ± 3.70 | 81.00 ± 2.59 | 82.25 ± 2.50 |
| 0.10 | 63.76 ± 3.71 | 62.08 ± 3.65 | 74.50 ± 2.90 | 71.75 ± 2.98 |
| 1.00 | 60.07 ± 3.84 | 59.73 ± 3.86 | 59.50 ± 3.24 | 54.00 ± 3.29 |
| PCA-based Distance | | | | |
| Median | 74.84 ± 3.25 | 74.84 ± 3.25 | 99.75 ± 0.25 | 99.75 ± 0.25 |
| 0.01 | 47.42 ± 3.77 | 51.61 ± 3.76 | 60.75 ± 3.21 | 58.50 ± 3.29 |
| 0.10 | 64.84 ± 3.69 | 59.68 ± 3.78 | 94.75 ± 1.52 | 95.50 ± 1.43 |
| 1.00 | 74.84 ± 3.31 | 71.94 ± 3.40 | 95.50 ± 1.34 | 91.75 ± 1.80 |

In the trials indicated by TABLE 1, the epsilon thresholds were chosen using the median of the minimum distance to the test samples over all generative model samples (marked "Median") or by percentiles as shown 0.01, 0.10, and 1.00. The row marked GAN MC-d includes results of applying the Monte Carlo integration technique of FIG. 4 to the DCGAN model described above. The row marked GAN MC-ε includes results of applying the Monte Carlo integration technique of FIG. 3 to the DCGAN model described above. The row marked VAE MC-d includes results of applying the Monte Carlo integration technique of FIG. 4 to the VAE model described above. The row marked VAE MC-ε includes results of applying the Monte Carlo integration technique of FIG. 3 to the VAE model described above.

Example 1 is a computer system for detecting training data for a generative model, the computer system comprising: a programmable processor; and a machine-readable medium comprising instructions thereon that, when executed by the programmable processor, causes the programmable processor to perform operations comprising: accessing generative model sample data comprising a plurality of generative model samples generated by a generative model; accessing a first test sample; determining whether a first generative model sample of the plurality of generative model samples is within a threshold distance of the first test sample; determining whether a second generative model sample of the plurality of generative model samples is within the threshold distance of the first test sample; determining that a probability that the generative model was trained with the first test sample is greater than a threshold probability, the determining based at least in part on whether the first generative model sample is within the threshold distance of the first test sample, the determining also based at least in part on whether the second generative model sample is within the threshold distance of the first test sample; and sending an alert message indicating that the generative model was trained with the first test sample.

In Example 2, the subject matter of Example 1 optionally includes wherein determining whether the first generative model sample of the plurality of generative model samples is within the threshold distance of the first test sample comprises determining a distance between the first generative model sample and the first test sample.

In Example 3, the subject matter of any one or more of Examples 1-2 optionally includes wherein determining whether the first generative model sample of the plurality of generative model samples is within the threshold distance of the first test sample comprises applying a logarithm to a distance between the first generative model sample and the first test sample.

In Example 4, the subject matter of any one or more of Examples 1-3 optionally includes wherein determining the probability that the generative model was trained with the first test sample comprises applying a kernel density estimator.

In Example 5, the subject matter of any one or more of Examples 1-4 optionally includes wherein the first generative model sample comprises a first image and the first test sample comprises a second image, and wherein the machine-readable medium further comprises instructions that, when executed by the programmable processor, cause the programmable processor to perform operations comprising: generating a principal component analysis (PCA) vector of the first image; generating a PCA vector of the second image; and determining a Euclidian distance between the PCA vector of the first image and the PCA vector of the second image.

In Example 6, the subject matter of any one or more of Examples 1-5 optionally includes wherein the first generative model sample comprises a first image and the first test sample comprises a second image, wherein the machine-readable medium further comprises instructions that, when executed by the programmable processor, cause the programmable processor to perform operations comprising: generating a Histogram of Oriented Gradients (HOG) of the first image; generating a HOG of the second image; and determining a Euclidian distance between the HOG of the first image and the HOG of the second image.

In Example 7, the subject matter of any one or more of Examples 1-6 optionally includes wherein the first generative model sample comprises a first image and the first test sample comprises a second image, wherein the machine-readable medium further comprises instructions that, when executed by the programmable processor, cause the programmable processor to perform operations comprising: generating a first color histogram describing a distribution of colors in the first image; generating a second color histogram describing a distribution of colors in the second image; and determining a Euclidian distance between the first color histogram and the second color histogram.

In Example 8, the subject matter of any one or more of Examples 1-7 optionally includes wherein the machine-readable medium further comprises instructions that, when executed by the programmable processor, cause the programmable processor to perform operations comprising: receiving a test set comprising a plurality of test samples, the plurality of test samples comprising the first test sample; and determining a plurality of pairwise distances based on the test set and the generative model sample data, a first pairwise distance of the plurality of pairwise distances indicating a distance between a second generative model sample of the plurality of generative model samples and a second test sample of the plurality of test samples, wherein the threshold distance is a median of the minimum distance to each test sample over the plurality of generative model samples.

In Example 9, the subject matter of any one or more of Examples 1-8 optionally includes wherein the machine-readable medium further comprises instructions that, when executed by the programmable processor, cause the programmable processor to perform operations comprising: receiving a test set comprising a plurality of test samples, the plurality of test samples comprising the first test sample; determining a plurality of pairwise distances based on the test set and the generative model sample data, a first pairwise distance of the plurality of pairwise distances indicating a distance between a second generative model sample of the plurality of generative model samples and a second test sample of the plurality of test samples; and determining a first pairwise distance of the plurality of pairwise distances that is at a first percentile of the plurality of pairwise distances, wherein the threshold distance is the first pairwise distance.

Example 10 is a method for attacking a generative model, the method comprising: accessing, by a computer system, generative model sample data comprising a plurality of generative model samples generated by a generative model; accessing, by the computer system, a first test sample; determining, by the computer system, whether a first generative model sample of the plurality of generative model samples is within a threshold distance of the first test sample; determining, by the computer system, whether a second generative model sample of the plurality of generative model samples is within the threshold distance of the first test sample; determining, by the computer system, that a probability that the generative model was trained with the first test sample is greater than or equal to a threshold probability, the determining based at least in part on whether the first generative model sample is within the threshold distance of the first test sample, the determining also based at least in part on whether the second generative model sample is within the threshold distance of the first test sample; and sending, by the computer system, an alert message indicating that the generative model was trained with the first test sample.

In Example 11, the subject matter of Example 10 optionally includes wherein determining whether the first generative model sample of the plurality of generative model samples is within the threshold distance of the first test sample comprises determining a distance between the first generative model sample and the first test sample.

In Example 12, the subject matter of any one or more of Examples 10-11 optionally includes wherein determining whether the first generative model sample of the plurality of generative model samples is within the threshold distance of the first test sample comprises applying a logarithm to a distance between the first generative model sample and the first test sample.

In Example 13, the subject matter of any one or more of Examples 10-12 optionally includes wherein determining the probability that the generative model was trained with the first test sample comprises applying a kernel density estimator.

In Example 14, the subject matter of any one or more of Examples 10-13 optionally includes wherein the first generative model sample comprises a first image and the first test sample comprises a second image, further comprising: generating a principal component analysis (PCA) vector of the first image; generating a PCA vector of the second image; and determining a Euclidian distance between the PCA vector of the first image and the PCA vector of the second image.

In Example 15, the subject matter of any one or more of Examples 10-14 optionally includes wherein the first generative model sample comprises a first image and the first test sample comprises a second image, further comprising: generating a Histogram of Oriented Gradients (HOG) of the first image; generating a HOG of the second image; and determining a Euclidian distance between the HOG of the first image and the HOG of the second image.

In Example 16, the subject matter of any one or more of Examples 10-15 optionally includes wherein the first generative model sample comprises a first image and the first test sample comprises a second image, further comprising: generating a first color histogram describing a distribution of colors in the first image; generating a second color histogram describing a distribution of colors in the second image; and determining a Euclidian distance between the first color histogram and the second color histogram.

In Example 17, the subject matter of any one or more of Examples 10-16 optionally includes receiving a test set comprising a plurality of test samples, the plurality of test samples comprising the first test sample; and determining a plurality of pairwise distances based on the test set and the generative model sample data, a first pairwise distance of the plurality of pairwise distances indicating a distance between a second generative model sample of the plurality of generative model samples and a second test sample of the plurality of test samples, wherein the threshold distance is a median of the minimum distance to each test sample over the plurality of generative model samples.

In Example 18, the subject matter of any one or more of Examples 10-17 optionally includes receiving a test set comprising a plurality of test samples, the plurality of test samples comprising the first test sample; determining a plurality of pairwise distances based on the test set and the generative model sample data, a first pairwise distance of the plurality of pairwise distances indicating a distance between a second generative model sample of the plurality of generative model samples and a second test sample of the plurality of test samples; and determining a first pairwise distance of the plurality of pairwise distances that is at a first percentile of the plurality of pairwise distances, wherein the threshold distance is the first pairwise distance.

Example 19 is a machine-readable medium comprising instructions thereon that, when executed by a processor, cause the processor to perform operations comprising: accessing generative model sample data comprising a plurality of generative model samples generated by a generative model; accessing a first test sample; determining whether a first generative model sample of the plurality of generative model samples is within a threshold distance of the first test sample; determining whether a second generative model sample of the plurality of generative model samples is within the threshold distance of the first test sample; determining that a probability that the generative model was trained with the first test sample is greater than or equal to a threshold probability, the determining based at least in part on whether the first generative model sample is within the threshold distance of the first test sample, the determining also based at least in part on whether the second generative model sample is within the threshold distance of the first test sample; and sending an alert message indicating that the generative model was trained with the first test sample.

In Example 20, the subject matter of Example 19 optionally includes wherein determining whether the first generative model sample of the plurality of generative model samples is within the threshold distance of the first test sample comprises determining a distance between the first generative model sample and the first test sample.

Electronic Software Architecture

Figure 9:
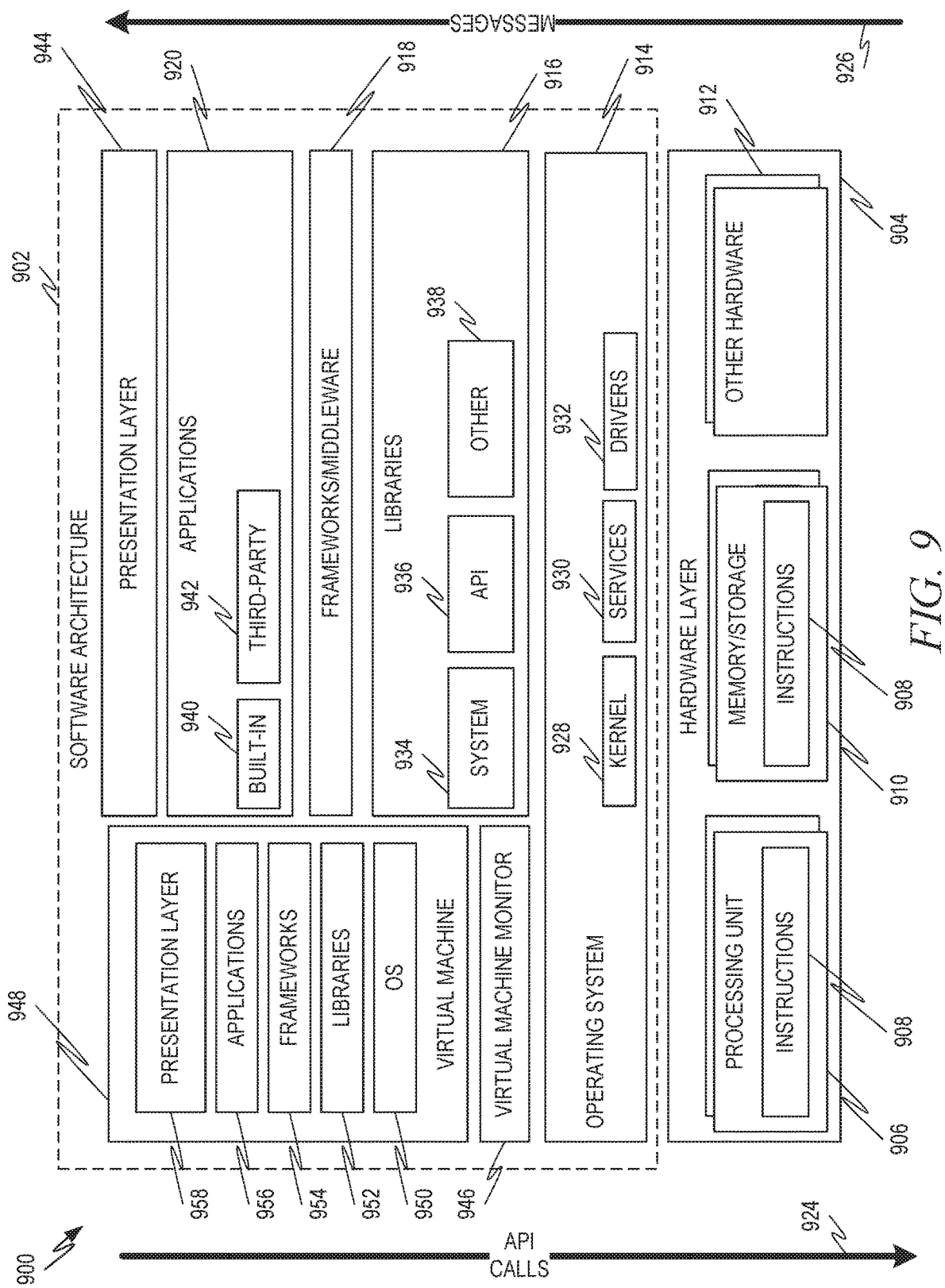
FIG. 9 is a block diagram showing one example of a software architecture for a computing device.

FIG. 9 is a block diagram 900 showing one example of a software architecture 902 for a computing device, such as the computer system 102. The architecture 902 may be used in conjunction with various hardware architectures, for example, as described herein. FIG. 9 is merely a non-limiting example of a software architecture and many other architectures may be implemented to facilitate the functionality described herein. A representative hardware layer 904 is illustrated and can represent, for example, any of the above referenced computing devices. In some examples, the hardware layer 904 may be implemented according to the architecture of the computer system 1000 of FIG. 10.

The representative hardware layer 904 comprises one or more processing units 906 having associated executable instructions 908. Executable instructions 908 represent the executable instructions of the software architecture 902, including implementation of the methods, modules, subsystems, and components, and so forth described herein and may also include memory and/or storage modules 910, which also have executable instructions 908. Hardware layer 904 may also comprise other hardware as indicated by other hardware 912, which represents any other hardware of the hardware layer 904, such as the other hardware illustrated, as part of computer system 1000.

In the example architecture of FIG. 9, the software architecture 902 may be conceptualized as a stack of layers where each layer provides particular functionality. For example, the software architecture 902 may include layers such as an operating system 914, libraries 916, frameworks/middleware 918, applications 920 and presentation layer 944. Operationally, the applications 920 and/or other components within the layers may invoke application programming interface (API) calls 924 through the software stack and access a response, returned values, and so forth illustrated as messages 926 in response to the API calls 924. The layers illustrated are representative in nature and not all software architectures have all layers. For example, some mobile or special purpose operating systems may not provide a frameworks/middleware layer 918, while others may provide such a layer. Other software architectures may include additional or different layers.

The operating system 914 may manage hardware resources and provide common services. The operating system 914 may include, for example, a kernel 928, services 930, and drivers 932. The kernel 928 may act as an abstraction layer between the hardware and the other software layers. For example, the kernel 928 may be responsible for memory management, processor management (e.g., scheduling), component management, networking, security settings, and so on. The services 930 may provide other common services for the other software layers. In some examples, the services 930 include an interrupt service. The interrupt service may detect the receipt of an interrupt and, in response, cause the architecture 902 to pause its current processing and execute an interrupt service routine (ISR) when an interrupt is accessed.

The drivers 932 may be responsible for controlling or interfacing with the underlying hardware. For instance, the drivers 932 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 916 may provide a common infrastructure that may be utilized by the applications 920 and/or other components and/or layers. The libraries 916 typically provide functionality that allows other software modules to perform tasks in an easier fashion than to interface directly with the underlying operating system 914 functionality (e.g., kernel 928, services 930 and/or drivers 932). The libraries 916 may include system libraries 934 (e.g., C standard library) that may provide functions such as memory allocation functions, string manipulation functions, mathematic functions, and the like. In addition, the libraries 916 may include API libraries 936 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 916 may also include a wide variety of other libraries 938 to provide many other APIs to the applications 920 and other software components/modules. In some examples, libraries 916 may provide one or more APIs serviced by a message oriented middleware.

The frameworks 918 (also sometimes referred to as middleware) may provide a higher-level common infrastructure that may be utilized by the applications 920 and/or other software components/modules. For example, the frameworks 918 may provide various graphic user interface (GUI) functions, high-level resource management, high-level location services, and so forth. The frameworks 918 may provide a broad spectrum of other APIs that may be utilized by the applications 920 and/or other software components/modules, some of which may be specific to a particular operating system or platform.

The applications 920 include built-in applications 940 and/or third-party applications 942. Examples of representative built-in applications 940 may include, but are not limited to, a contacts application, a browser application, a book reader application, a location application, a media application, a messaging application, and/or a game application. Third-party applications 942 may include any of the built-in applications 940 as well as a broad assortment of other applications. In a specific example, the third-party application 942 (e.g., an application developed using the Android™ or iOS™ software development kit (SDK) by an entity other than the vendor of the particular platform) may be mobile software running on a mobile operating system such as iOST™, Android™, Windows® Phone, or other mobile computing device operating systems. In this example, the third-party application 942 may invoke the API calls 924 provided by the mobile operating system such as operating system 914 to facilitate functionality described herein.

The applications 920 may utilize built-in operating system functions (e.g., kernel 928, services 930 and/or drivers 932), libraries (e.g., system 934, APIs 936, and other libraries 938), frameworks/middleware 918 to create user interfaces to interact with users of the system. Alternatively, or additionally, in some systems interactions with a user may occur through a presentation layer, such as presentation layer 944. In these systems, the application/module "logic" can be separated from the aspects of the application/module that interact with a user.

Some software architectures utilize virtual machines. In the example of FIG. 9, this is illustrated by virtual machine 948. A virtual machine creates a software environment where applications/modules can execute as if they were executing on a hardware computing device. A virtual machine 948 is hosted by a host operating system (operating system 914) and typically, although not always, has a virtual machine monitor 946, which manages the operation of the virtual machine 948 as well as the interface with the host operating system (i.e., operating system 914). A software architecture executes within the virtual machine 948 such as an operating system 950, libraries 952, frameworks/middleware 954, applications 956 and/or presentation layer 958. These layers of software architecture executing within the virtual machine 948 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in rime. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a communication network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computer system can include clients and servers. A client and server are generally remote from each other and typically interact through a communication network. The relationship of client and server arises by virtue of computer programs running on the respective computers and having a client-server relationship to each other. In embodiments deploying a programmable computer system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 10:
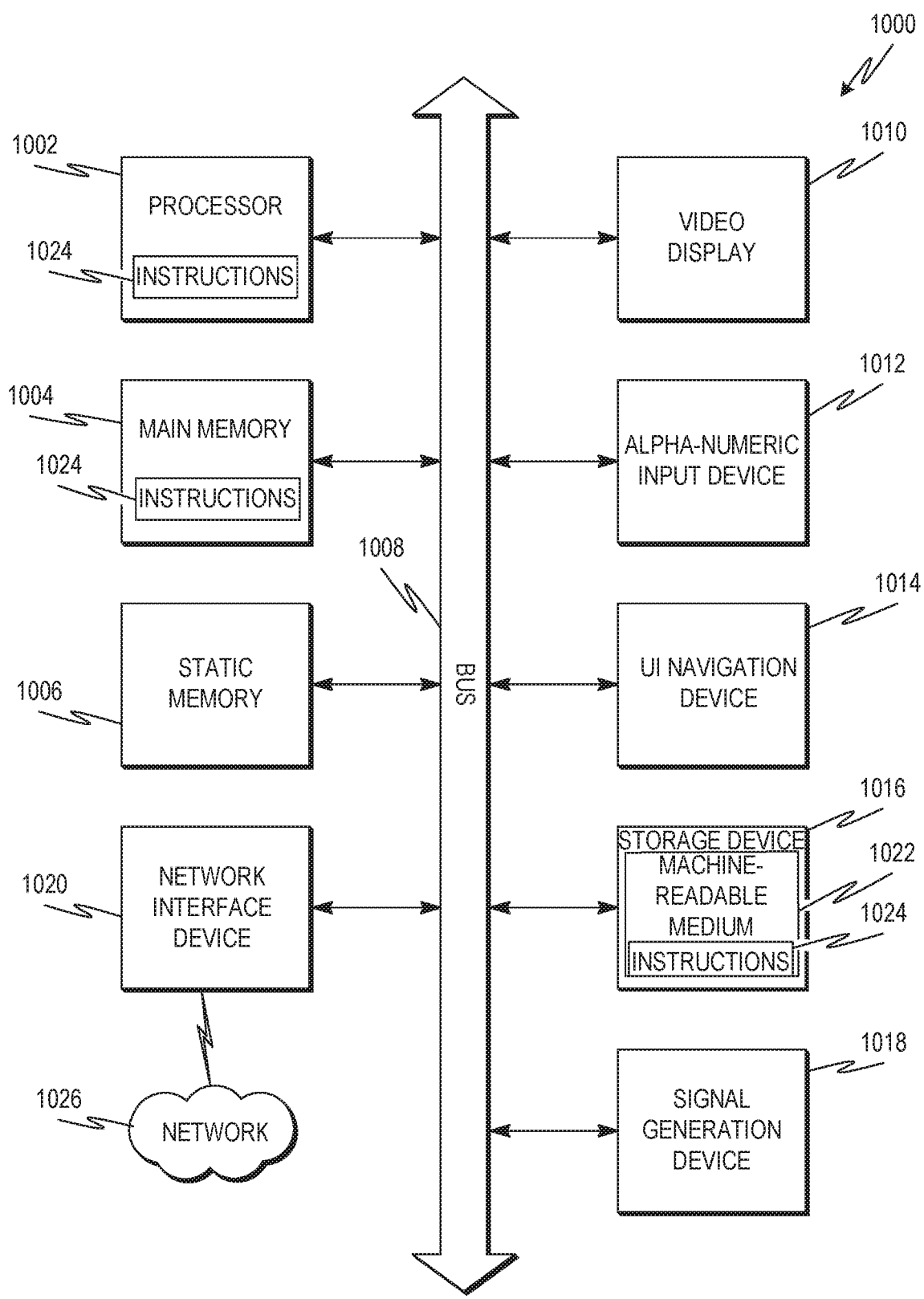
FIG. 10 is a block diagram of a machine in the example form of a computer system within which instructions may be executed for causing the machine to perform any one or more of the methodologies discussed herein.

FIG. 10 is a block diagram of a machine in the example form of a computer system 1000 within which instructions 1024 may be executed for causing the machine to perform any one or more of the methodologies discussed herein. In alternative embodiments, the machine operates as a stand-alone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU), or both), a main memory 1004, and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard or a touch-sensitive display screen), a user interface (UI) navigation (or cursor control) device 1014 (e.g., a mouse), a disk drive device 1016, a signal generation device 1018 (e.g., a speaker), and a network interface device 1020.

Machine-Readable Medium

The disk drive device 1016 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004 and/or within the processor 1002 during execution thereof by the computer system 1000, with the main memory 1004 and the processor 1002 also constituting machine-readable media 1022.

While the machine-readable medium 1022 is shown in an example embodiment to be a single medium, the term "machine-readable medium" may include a single medium or multiple media (e.g., a centralized or distributed database, and/or associated caches and servers) that store the one or more instructions 1024 or data structures. The term "machine-readable medium" shall also be taken to include any tangible medium that is capable of storing, encoding, or carrying instructions 1024 for execution by the machine and that cause the machine to perform any one or more of the methodologies of the present disclosure, or that is capable of storing, encoding, or carrying data structures utilized by or associated with such instructions 1024. The term "machine-readable medium" shall accordingly be taken to include, but not be limited to, solid-state memories, and optical and magnetic media. Specific examples of machine-readable media 1022 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 1024 may further be transmitted or received over a communications network 1026 using a transmission medium. The instructions 1024 may be transmitted using the network interface device 1020 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 1024 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A computer system for detecting training data for a generative model, the computer system comprising:
   a programmable processor; and
   a machine-readable medium comprising instructions thereon that, when executed by the programmable processor, causes the programmable processor to perform operations comprising:
      accessing generative model sample data comprising a plurality of generative model samples generated by a generative model;
      accessing a first test sample;
      determining whether a first generative model sample of the plurality of generative model samples is within a threshold distance of the first test sample;
      determining whether a second generative model sample of the plurality of generative model samples is within the threshold distance of the first test sample;
      determining that a probability that the generative model was trained with the first test sample is greater than a threshold probability, the determining based at least in part on whether the first generative model sample is within the threshold distance of the first test sample, the determining also based at least in part on whether the second generative model sample is within the threshold distance of the first test sample; and
      sending an alert message indicating that the generative model was trained with the first test sample.

2. The computer system of claim 1, wherein determining whether the first generative model sample of the plurality of generative model samples is within the threshold distance of the first test sample comprises determining a distance between the first generative model sample and the first test sample.

3. The computer system of claim 1, wherein determining whether the first generative model sample of the plurality of generative model samples is within the threshold distance of the first test sample comprises applying a logarithm to a distance between the first generative model sample and the first test sample.

4. The computer system of claim 1, wherein determining the probability that the generative model was trained with the first test sample comprises applying a kernel density estimator.

5. The computer system of claim 1, wherein the first generative model sample comprises a first image and the first test sample comprises a second image, and wherein the machine-readable medium further comprises instructions that, when executed by the programmable processor, cause the programmable processor to perform operations comprising:
   generating a principal component analysis (PCA) vector of the first image;
   generating a PCA vector of the second image; and
   determining a Euclidian distance between the PCA vector of the first image and the PCA vector of the second image.

6. The computer system of claim 1, wherein the first generative model sample comprises a first image and the first test sample comprises a second image, wherein the machine-readable medium further comprises instructions that, when executed by the programmable processor, cause the programmable processor to perform operations comprising:
   generating a Histogram of Oriented Gradients (HOG) of the first image;
   generating a HOG of the second image; and
   determining a Euclidian distance between the HOG of the first image and the HOG of the second image.

7. The computer system of claim 1, wherein the first generative model sample comprises a first image and the first test sample comprises a second image, wherein the machine-readable medium further comprises instructions that, when executed by the programmable processor, cause the programmable processor to perform operations comprising:
   generating a first color histogram describing a distribution of colors in the first image;
   generating a second color histogram describing a distribution of colors in the second image; and
   determining a Euclidian distance between the first color histogram and the second color histogram.

8. The computer system of claim 1, wherein the machine-readable medium further comprises instructions that, when executed by the programmable processor, cause the programmable processor to perform operations comprising:
   receiving a test set comprising a plurality of test samples, the plurality of test samples comprising the first test sample; and
   determining a plurality of pairwise distances based on the test set and the generative model sample data, a first pairwise distance of the plurality of pairwise distances indicating a distance between a second generative model sample of the plurality of generative model samples and a second test sample of the plurality of test samples, wherein the threshold distance is a median of the minimum distance to each test sample over the plurality of generative model samples.

9. The computer system of claim 1, wherein the machine-readable medium further comprises instructions that, when executed by the programmable processor, cause the programmable processor to perform operations comprising:
   receiving a test set comprising a plurality of test samples, the plurality of test samples comprising the first test sample;
   determining a plurality of pairwise distances based on the test set and the generative model sample data, a first pairwise distance of the plurality of pairwise distances indicating a distance between a second generative model sample of the plurality of generative model samples and a second test sample of the plurality of test samples; and
   determining a first pairwise distance of the plurality of pairwise distances that is at a first percentile of the plurality of pairwise distances, wherein the threshold distance is the first pairwise distance.

10. A method for attacking a generative model, the method comprising:
   accessing, by a computer system, generative model sample data comprising a plurality of generative model samples generated by a generative model;
   accessing, by the computer system, a first test sample;
   determining, by the computer system, whether a first generative model sample of the plurality of generative model samples is within a threshold distance of the first test sample;
   determining, by the computer system, whether a second generative model sample of the plurality of generative model samples is within the threshold distance of the first test sample;
   determining, by the computer system, that a probability that the generative model was trained with the first test sample is greater than or equal to a threshold probability, the determining based at least in part on whether the first generative model sample is within the threshold distance of the first test sample, the determining also based at least in part on whether the second generative model sample is within the threshold distance of the first test sample; and sending, by the computer system, an alert message indicating that the generative model was trained with the first test sample.

11. The method of claim 10, wherein determining whether the first generative model sample of the plurality of generative model samples is within the threshold distance of the first test sample comprises determining a distance between the first generative model sample and the first test sample.

12. The method of claim 10, wherein determining whether the first generative model sample of the plurality of generative model samples is within the threshold distance of the first test sample comprises applying a logarithm to a distance between the first generative model sample and the first test sample.

13. The method of claim 10, wherein determining the probability that the generative model was trained with the first test sample comprises applying a kernel density estimator.

14. The method of claim 10, wherein the first generative model sample comprises a first image and the first test sample comprises a second image, further comprising:
generating a principal component analysis (PCA) vector of the first image;
generating a PCA vector of the second image; and
determining a Euclidian distance between the PCA vector of the first image and the PCA vector of the second image.

15. The method of claim 10, wherein the first generative model sample comprises a first image and the first test sample comprises a second image, further comprising:
generating a Histogram of Oriented Gradients (HOG) of the first image;
generating a HOG of the second image; and
determining a Euclidian distance between the HOG of the first image and the HOG of the second image.

16. The method of claim 10, wherein the first generative model sample comprises a first image and the first test sample comprises a second image, further comprising:
generating a first color histogram describing a distribution of colors in the first image;
generating a second color histogram describing a distribution of colors in the second image; and
determining a Euclidian distance between the first color histogram and the second color histogram.

17. The method of claim 10, further comprising:
receiving a test set comprising a plurality of test samples, the plurality of test samples comprising the first test sample; and
determining a plurality of pairwise distances based on the test set and the generative model sample data, a first pairwise distance of the plurality of pairwise distances indicating a distance between a second generative model sample of the plurality of generative model samples and a second test sample of the plurality of test samples, wherein the threshold distance is a median of the minimum distance to each test sample over the plurality of generative model samples.

18. The method of claim 10, further comprising:
receiving a test set comprising a plurality of test samples, the plurality of test samples comprising the first test sample;
determining a plurality of pairwise distances based on the test set and the generative model sample data, a first pairwise distance of the plurality of pairwise distances indicating a distance between a second generative model sample of the plurality of generative model samples and a second test sample of the plurality of test samples; and
determining a first pairwise distance of the plurality of pairwise distances that is at a first percentile of the plurality of pairwise distances, wherein the threshold distance is the first pairwise distance.

19. A machine-readable medium comprising instructions thereon that, when executed by a processor, cause the processor to perform operations comprising:
accessing generative model sample data comprising a plurality of generative model samples generated by a generative model;
accessing a first test sample;
determining whether a first generative model sample of the plurality of generative model samples is within a threshold distance of the first test sample;
determining whether a second generative model sample of the plurality of generative model samples is within the threshold distance of the first test sample;
determining that a probability that the generative model was trained with the first test sample is greater than or equal to a threshold probability, the determining based at least in part on whether the first generative model sample is within the threshold distance of the first test sample, the determining also based at least in part on whether the second generative model sample is within the threshold distance of the first test sample; and
sending an alert message indicating that the generative model was trained with the first test sample.

20. The machine-readable medium of claim 19, wherein determining whether the first generative model sample of the plurality of generative model samples is within the threshold distance of the first test sample comprises determining a distance between the first generative model sample and the first test sample.

* * * * *